(12) United States Patent
Lin

(10) Patent No.: US 9,973,087 B1
(45) Date of Patent: May 15, 2018

(54) POWER CONVERSION APPARATUS

(71) Applicant: Power Forest Technology Corporation, Hsinchu County (TW)

(72) Inventor: Pao-Chuan Lin, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days. days.

(21) Appl. No.: 15/384,322

(22) Filed: Dec. 20, 2016

(30) Foreign Application Priority Data

Nov. 10, 2016 (TW) .............................. 105136571 A

(51) Int. Cl.
*H02M 3/158* (2006.01)
*H02M 1/096* (2006.01)
*H02M 1/32* (2007.01)
*H02M 1/00* (2006.01)

(52) U.S. Cl.
CPC ........... *H02M 3/158* (2013.01); *H02M 1/096* (2013.01); *H02M 1/32* (2013.01); *H02M 2001/0009* (2013.01)

(58) Field of Classification Search
CPC .......... H02M 1/08; H02M 1/096; H02M 1/36; H02M 3/156; H02M 3/158; H02M 3/1588; H02M 1/32; H02M 2001/0009
See application file for complete search history.

(56) References Cited

U.S. PATENT DOCUMENTS

| | | | |
|---|---|---|---|
| 7,233,131 B2 | 6/2007 | Lin et al. | |
| 7,315,190 B1 | 1/2008 | Chen | |
| 7,710,089 B2* | 5/2010 | Kohout | H02M 3/157 323/273 |
| 7,884,590 B2 | 2/2011 | Liu | |
| 2010/0134091 A1* | 6/2010 | Eom | H02M 1/36 324/76.11 |
| 2011/0075452 A1* | 3/2011 | Santoro | H02M 1/083 363/56.1 |
| 2011/0260707 A1* | 10/2011 | Imanishi | H02M 1/08 323/311 |
| 2013/0265024 A1* | 10/2013 | Chen | H02M 1/08 323/282 |
| 2014/0062431 A1 | 3/2014 | Yanase et al. | |
| 2014/0210444 A1* | 7/2014 | Nakamura | H02M 1/08 323/283 |
| 2015/0042298 A1* | 2/2015 | Kung | H02M 3/1588 323/271 |

(Continued)

FOREIGN PATENT DOCUMENTS

| | | |
|---|---|---|
| TW | 200614637 | 5/2006 |
| TW | 201342784 | 10/2013 |

(Continued)

OTHER PUBLICATIONS

"Office Action of Taiwan Counterpart Application", dated Jan. 23, 2017, p. 1-p. 5, in which the listed references were cited.

*Primary Examiner* — Fred E Finch, III

(74) *Attorney, Agent, or Firm* — JCIPRNET

(57) ABSTRACT

A power conversion apparatus is provided. A detecting circuit detects a current flowing into a boot voltage input pin and converts the current into a corresponding detecting voltage. An adjusting signal generating circuit generates an adjusting signal according to the detecting voltage. A control circuit adjusts control parameters thereof according to the adjusting signal.

6 Claims, 3 Drawing Sheets

(56) References Cited

U.S. PATENT DOCUMENTS

2016/0142049 A1* 5/2016 Richardson .......... H03K 17/687
    327/109
2016/0190925 A1* 6/2016 Tan ....................... H02M 3/158
    323/271

FOREIGN PATENT DOCUMENTS

| TW | 201404023 | 1/2014 |
| TW | 201423121 | 6/2014 |

* cited by examiner

POWER CONVERSION APPARATUS

CROSS-REFERENCE TO RELATED APPLICATION

This application claims the priority benefits of Taiwan application serial no. 105136571, filed on Nov. 10, 2016. The entirety of the above-mentioned patent application is hereby incorporated by reference herein and made a part of this specification.

BACKGROUND OF THE INVENTION

Field of the Invention

The invention relates to an electronic apparatus, and more particularly, to a power conversion apparatus.

Description of Related Art

When functions of an integrated circuit are increased, the number of pins needs to be increased in order to receive input signals and/or output signals corresponding to the new functions. However, since the increase in the number of pins leads to an increase in packaging cost, in consideration of the cost, an increase in the number of signal pins is generally to be avoided if possible. For example, in a control circuit configured to control light emission of a light emitting diode, the number of pins is preferably decreased considering product volume, manufacturing cost, and so on. Therefore, how to decrease the number of pins of the control circuit while maintaining normal operation of the control circuit is one critical issue in designing an integrated circuit.

SUMMARY OF THE INVENTION

The invention provides a power conversion apparatus which makes it possible to decrease the number of pins of a control circuit while maintaining normal operation of the power conversion apparatus.

The power conversion apparatus of the invention includes a power conversion circuit and a control circuit. The power conversion circuit is configured to convert an input voltage to an output voltage. The power conversion circuit has an upper bridge switch and a lower bridge switch. The upper bridge switch and the lower bridge switch are connected in series between the input voltage and a ground. The upper bridge switch and the lower bridge switch respectively receive a first pulse width modulation signal and a second pulse width modulation signal to switch their own conduction states, and convert the input voltage to the output voltage. The control circuit is coupled to the power conversion circuit and has a boot voltage input pin. The control circuit includes a detecting circuit and an adjusting signal generating circuit. The detecting circuit is coupled to the boot voltage input pin, detects a current flowing into boot voltage input pin input pin and converts the current to a corresponding detecting voltage. The adjusting signal generating circuit is coupled to the detecting circuit, and generates an adjusting signal according to the detecting voltage. The control circuit adjusts a control parameter of the control circuit according to the adjusting signal.

In one embodiment of the invention, the aforementioned detecting circuit includes a current detecting circuit and a conversion circuit. The current detecting circuit is coupled to the boot voltage input pin, detects the current flowing into the boot voltage input pin and outputs a detecting current. The conversion circuit converts the detecting current to the corresponding detecting voltage.

In one embodiment of the invention, the aforementioned current detecting circuit includes a differential amplifier, a first transistor, and a second transistor. A positive input terminal of the differential amplifier is coupled to the boot voltage input pin. A negative input terminal of the differential amplifier is coupled to a reference voltage. The first transistor is coupled between the positive input terminal of the differential amplifier and the ground. A gate of the first transistor is coupled to an output terminal of the differential amplifier. The second transistor is coupled between an input terminal of the conversion circuit and the ground. A gate of the second transistor is coupled to the output terminal of the differential amplifier.

In one embodiment of the invention, the aforementioned conversion circuit includes an analog-to-digital circuit and a digital-to-analog circuit.

In one embodiment of the invention, the aforementioned adjusting signal generating circuit includes a comparator, wherein a positive input terminal of the comparator receives the detecting voltage. A negative input terminal of the comparator is coupled to a common contact point of the upper bridge switch and the lower bridge switch. An output terminal of the comparator is configured to output the adjusting signal.

In one embodiment of the invention, the aforementioned control parameter indicates the conduction states or conduction frequencies of the upper bridge switch and the lower bridge switch.

In one embodiment of the invention, the aforementioned power conversion apparatus further includes a setting resistor and a rectifier diode, wherein an anode of the rectifier diode is coupled to a power voltage. The setting resistor is coupled between a cathode of the rectifier diode and the boot voltage input pin.

In one embodiment of the invention, the aforementioned power conversion apparatus further includes a first driving circuit, wherein the first driving circuit is coupled to the boot voltage input pin, the common contact point of the upper bridge switch and the lower bridge switch and the upper bridge switch, and outputs the first pulse width modulation signal. A second driving circuit is coupled to output the second pulse width modulation signal.

Based on the above, in the embodiments of the invention, by detecting the current flowing into the boot voltage input pin and converting the current to the corresponding detecting voltage, and by generating the adjusting signal according to the detecting voltage, the control parameter of the control circuit can be adjusted by the control circuit according to the adjusting signal. Accordingly, the existing boot voltage input pin is applied in current sensing, and, according to a sensing result, the control of the upper bridge switch and the lower bridge switch is adjusted so that the boot voltage input pin becomes a multifunctional pin, thus effectively avoiding an increase in the number of pins of the control circuit.

To make the aforementioned features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

Figure 1:
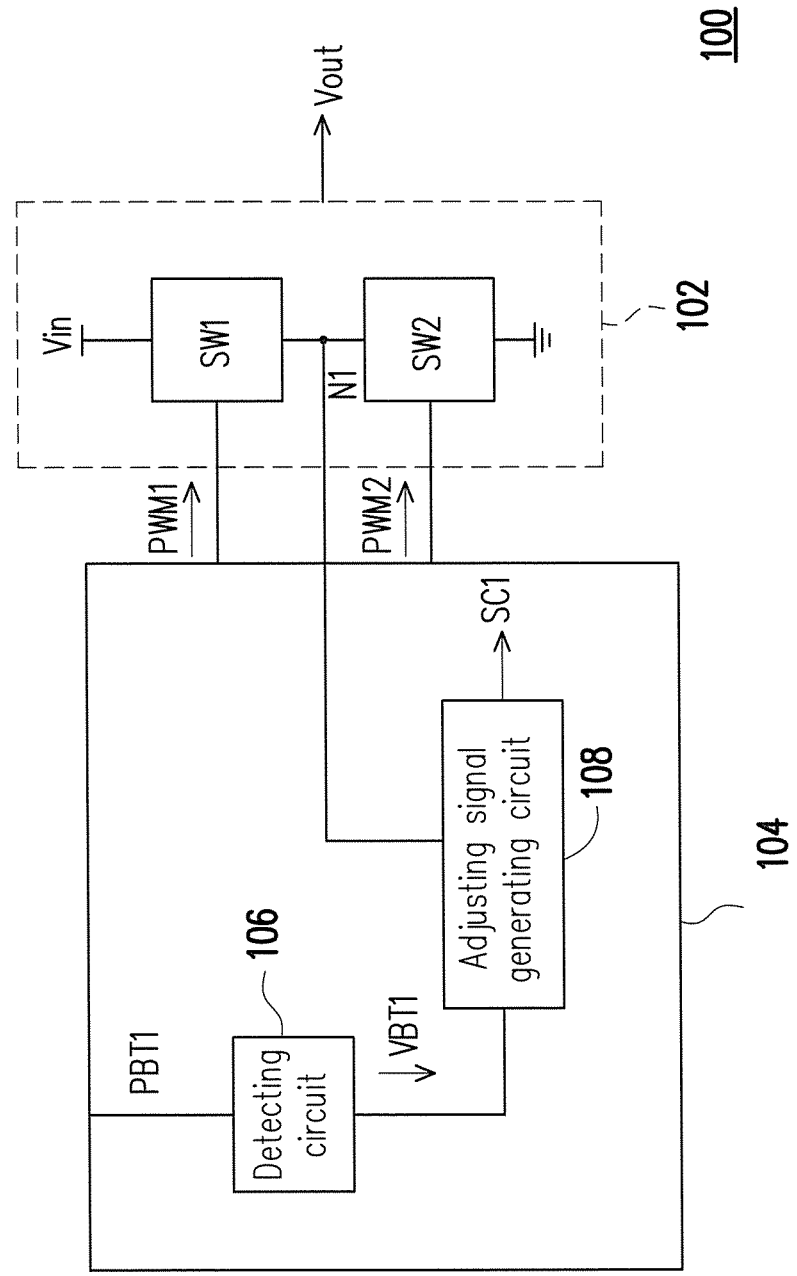
FIG. 1 is a schematic view of a power conversion apparatus according to an embodiment of the invention.

FIG. 1 is a schematic view of a power conversion apparatus according to an embodiment of the invention. Please refer to FIG. 1. A power conversion apparatus 100 includes a power conversion circuit 102 and a control circuit 104. The power conversion circuit 102 is coupled to the control circuit 104, wherein the power conversion circuit 102 includes an upper bridge switch SW1 and a lower bridge switch SW2. The upper bridge switch SW1 and the lower bridge switch SW2 are connected in series between an input voltage Vin and a ground. A common contact point N1 of the upper bridge switch SW1 and the lower bridge switch SW2 is coupled to the control circuit 104. The control circuit 104 includes a detecting circuit 106 and an adjusting signal generating circuit 108. The detecting circuit 106 is coupled to a boot voltage input pin PBT1 and the adjusting signal generating circuit 108 of the control circuit 104. The adjusting signal generating circuit 108 is further coupled to the common contact point N1 of the upper bridge switch SW1 and the lower bridge switch SW2.

The control circuit 104 outputs and receives a pulse width modulation signal PWM1 and a pulse width modulation signal PWM2 so as to respectively switch conduction states of the upper bridge switch SW1 and the lower bridge switch SW2, and converts the input voltage Vin to an output voltage Vout. The detecting circuit 106 detects a current flowing into the boot voltage input pin PBT1 and converts the current to a corresponding detecting voltage VBT1. The adjusting signal generating circuit 108 generates an adjusting signal SC1 according to the detecting voltage VBT1 and a phase voltage generated at the common contact point N1, such that the control circuit 104 adjusts a control parameter thereof according to the adjusting signal SC1. The control parameter is configured to, for example, instruct the control circuit 104 to control the conduction states, conduction periods, or conduction frequencies, and the like of the upper bridge switch SW1 and the lower bridge SW2. For example, the control circuit 104 determines whether it is necessary to perform overcurrent protection according to the adjusting signal SC1. If yes, the control circuit 104 stops outputting the pulse width modulation signal PWM1 and the pulse width modulation signal PWM2, so as to turn off the upper bridge switch SW1 and the lower bridge switch SW2, thus avoiding damage to the elements.

Accordingly, the existing boot voltage input pin PBT1 is applied in current sensing, and, according to a sensing result, the control of the upper bridge switch SW1 and the lower bridge switch SW2 is adjusted. The boot voltage input pin PBT1 thus becomes a multifunctional pin, and an increase in the number of pins of the control circuit 104 is effectively avoided.

Figure 2:
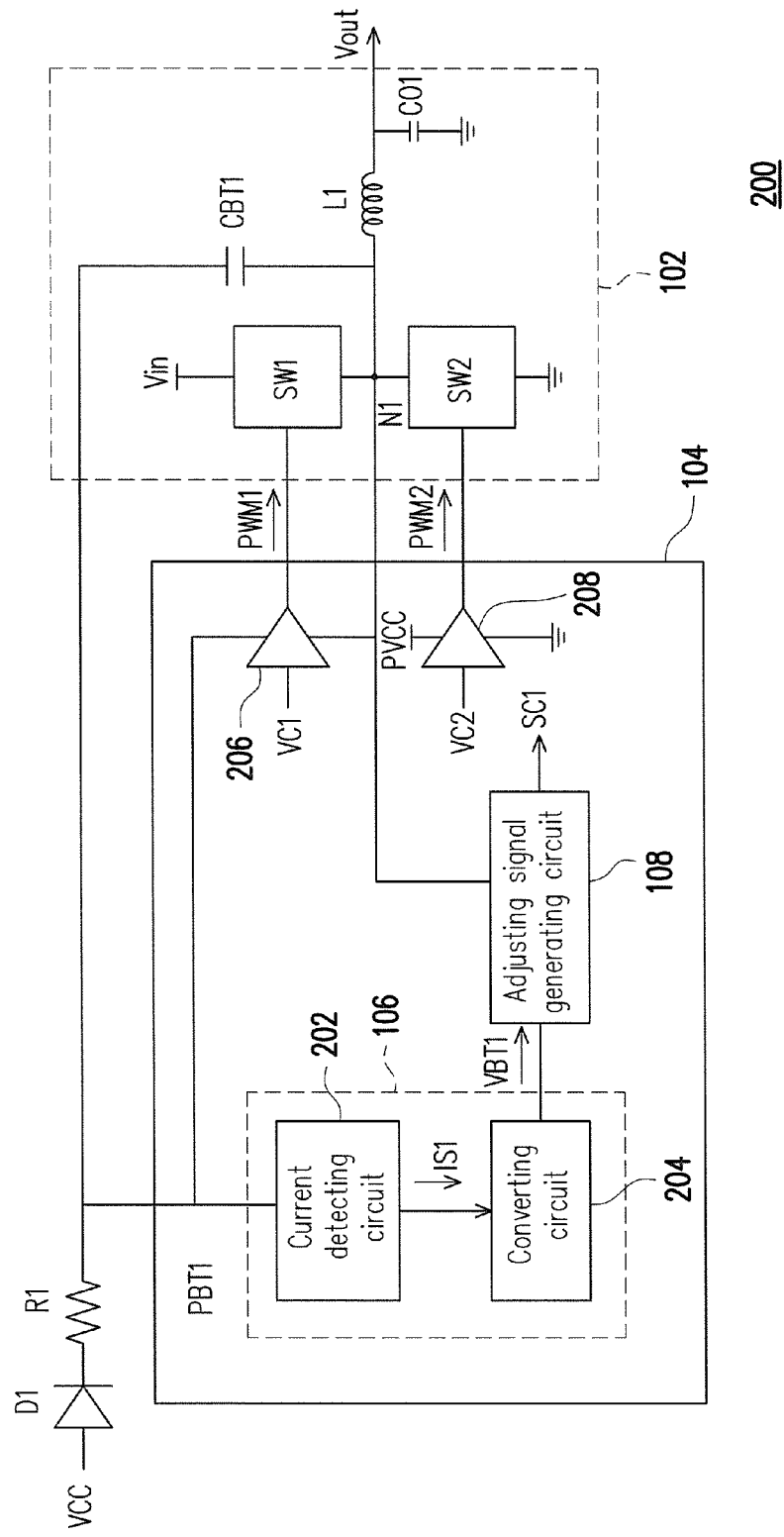
FIG. 2 is a schematic view of the power conversion apparatus according to another embodiment of the invention.

FIG. 2 is a schematic view of a power conversion apparatus according to an embodiment of the invention. Please refer to FIG. 2. Specifically, the detecting circuit 106 in the embodiment of FIG. 1 includes a current detecting circuit 202 and a conversion circuit 204. The current detecting circuit 202 is coupled to the boot voltage input pin PBT1 and the conversion circuit 204. The conversion circuit 204 is further coupled to the adjusting signal generating circuit 108. Besides, the control circuit 104 further includes a driving circuit 206 and a driving circuit 208. One power terminal of the driving circuit 206 is coupled to the boot voltage input pin PBT1, and the other power terminal of the driving circuit 206 is coupled to the common contact point N1 of the upper bridge switch SW1 and the lower bridge switch SW2. The driving circuit 206 receives a control voltage VC1 provided by the control circuit 104 and outputs the pulse width modulation signal PWM1. One power terminal of the driving circuit 208 is coupled to an operating voltage PVCC, and the other power terminal of the driving circuit 208 is coupled to the ground. The driving circuit 208 receives a control voltage VC2 provided by the control circuit 104, and outputs the pulse width modulation signal PWM2.

On the other hand, the power conversion circuit 102 of the present embodiment further includes a boot capacitor CBT1, an inductor L1, and an output capacitor CO1. The boot capacitor CBT1 is coupled between the boot voltage input pin PBT1 and the contact point N1. The inductor L1 is coupled to the contact point N1 and one terminal of the output capacitor CO1. The other terminal of the output capacitor CO1 is coupled to the ground. Besides, a power conversion apparatus 200 of the present embodiment further includes a rectifier diode D1 and a setting resistor R1. The setting resistor R1 is coupled between a cathode of the rectifier diode D1 and the boot voltage input pin PBT1. An anode of the rectifier diode D1 is coupled to a power voltage VCC.

The current detecting circuit 202 detects the current flowing into the boot voltage input pin PBT1 and outputs a detecting current IS1. The conversion circuit 204 converts the detecting current IS1 to the corresponding detecting voltage VBT1, such that the adjusting signal generating circuit 108 generates the adjusting signal SC1 according to the detecting voltage VBT1. The control circuit 104 provides the control voltage VC1 and the control voltage VC2 to the driving circuit 206 and the driving circuit 208 respectively according to the adjusting signal SC1 so as to control the driving circuit 206 and the driving circuit 208 to output the pulse width modulation signal PWM1 and the pulse width modulation signal PWM2 to switch the conduction states of the upper bridge switch SW1 and the lower bridge switch SW2. By switching the conduction states of the upper bridge switch SW1 and the lower bridge switch SW2, the control circuit 104 controls the magnitude of the input voltage Vin transmitted to the contact point N1. In addition, the inductor L1 and the output capacitor CO1 convert the voltage at the contact point N1 to the output voltage Vout.

For example, the adjusting signal SC1 is used to determine whether to perform overcurrent protection. The control circuit 104 detects whether a voltage difference of the upper bridge switch SW1 or a voltage difference of the lower bridge switch SW2 is greater than VBT1. If yes, the control circuit 104 stops outputting the pulse width modulation signal PWM1 to turn off the upper bridge switch SW1, thereby avoiding damage to the elements. In the above, a preset voltage or a preset current is set by, for example, changing a resistance value of the setting resistor R1. It is noted that the adjusting signal SC1 is not merely used to determine whether to perform overcurrent protection. In some embodiments, according to the adjusting signal SC1, the control circuit 104 also adjusts the other control parameters thereof, for example, control of the conduction frequencies or the conduction periods of the upper bridge switch SW1 and the lower bridge switch SW2, and so on.

Figure 3:
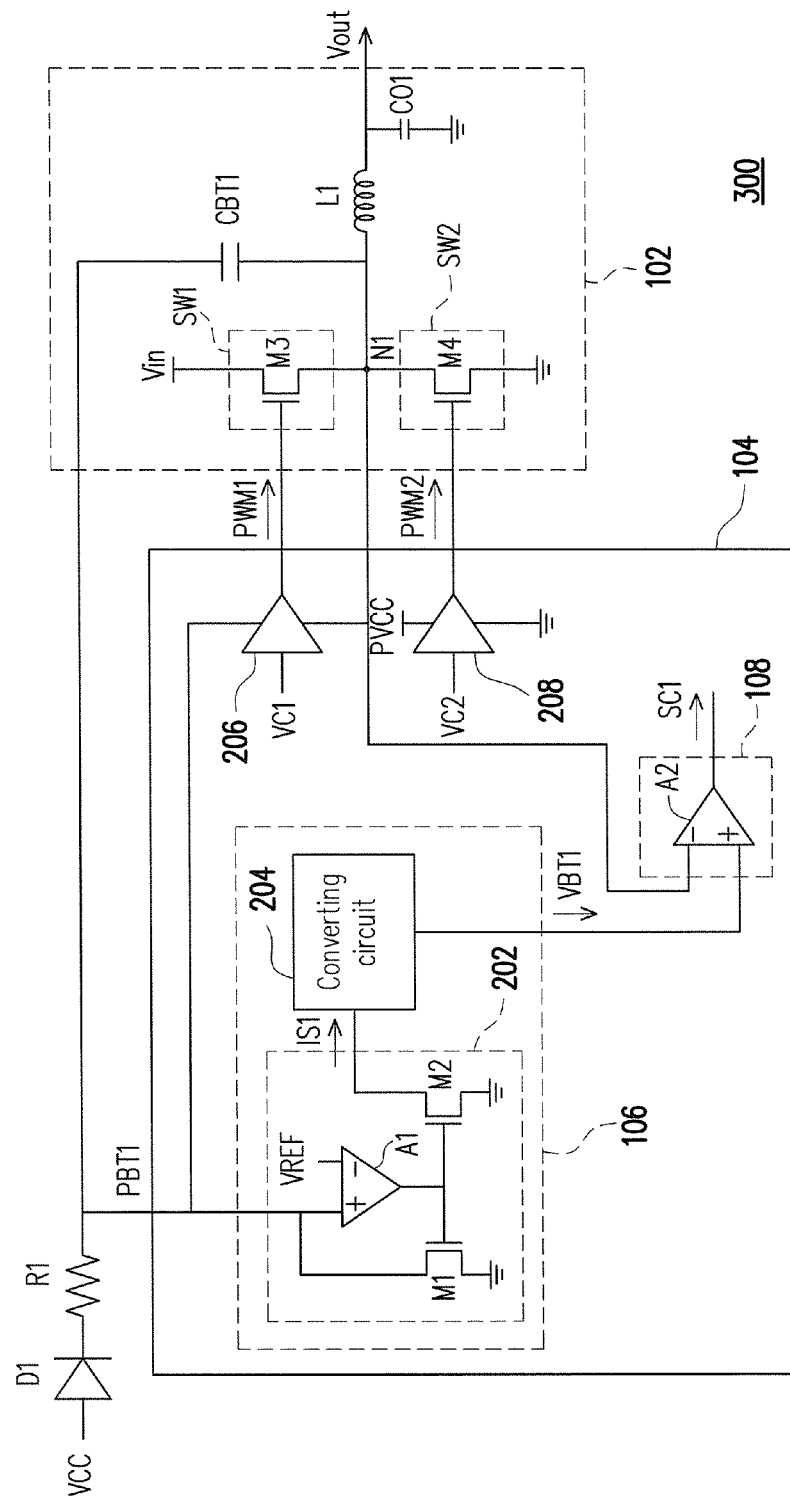
FIG. 3 is a schematic view of the power conversion apparatus according to another embodiment of the invention.

FIG. 3 is a schematic view of a power conversion apparatus according to an embodiment of the invention. Please refer to FIG. 3. In detail, in the present embodiment, the current detecting circuit 202 of a power conversion apparatus 300 includes, for example, a differential amplifier A1, a transistor M1, and a transistor M2. A positive input terminal of the differential amplifier A1 is coupled to the boot voltage input pin PBT1. A negative input terminal of the differential amplifier A1 is coupled to a reference voltage VREF. The transistor M1 is coupled between the positive input terminal of the differential amplifier A1 and the ground. The transistor M2 is coupled between an input terminal of the conversion circuit 204 and the ground. Gates of the transistors M1 and M2 are coupled to an output terminal of the differential amplifier A1. In the present embodiment, the conversion circuit 204 can be implemented as, for example, an analog-to-digital circuit and a digital-to-analog circuit; however, the invention is not limited thereto. Besides, the adjusting signal generating circuit 108 can be implemented as, for example, a comparator A2. A positive input terminal of the comparator A2 is coupled to the conversion circuit 204 to receive the detecting voltage VBT1. A negative input terminal of the comparator A2 is coupled to the common contact point N1 of the upper bridge switch SW1 and the lower bridge switch SW2. An output terminal of the comparator A2 is used to output the adjusting signal SC1. Besides, in the present embodiment, the upper bridge switch SW1 and the lower bridge switch SW2 can be respectively implemented as transistors M3 and M4; however, the invention is not limited thereto.

As shown in FIG. 3, the current detecting circuit 202 composed of the differential amplifier A1 and the transistors M1 and M2 generates the detecting current IS1 for the conversion circuit 204 at a drain of the transistor M2. In the present embodiment, the analog-to-digital circuit and the digital-to-analog circuit in the conversion circuit 204 convert the detecting current IS1 to a digital signal, and then, according to the digital signal, outputs to the detecting voltage VBT1 corresponding to the detecting current IS1. The comparator A2 compares the magnitude between the detecting voltage VBT1 and a voltage at the contact point N1 so as to output the adjusting signal SC1, such that the control circuit 104 adjusts the control parameter thereof according to the adjusting signal SC1. As described above, a reference value of a transition variation of the adjusting signal SC1 can be adjusted by changing the resistance value of the setting resistor R1. In some embodiments, the reference value of the transition variation of the adjusting signal SC1 can also be adjusted by setting a conversion relationship between the detection current IS1 and the detection voltage VBT1 based on which the conversion circuit 204 performs conversion of the detection current IS1.

In summary of the above, in the embodiments of the invention, by detecting the current flowing into the boot voltage input pin and converting the current to the corresponding detecting voltage, and by generating the adjusting signal according to the detecting voltage and the phase voltage at the common contact point of the upper bridge switch and the lower bridge switch, the control circuit is capable of adjusting the control parameter of the upper bridge switch and the lower bridge switch according to the adjusting signal. Accordingly, the existing boot voltage input pin is applied in current sensing, and according to the sensing result, the control of the upper bridge switch and the lower bridge switch is adjusted, so that the boot voltage input pin becomes a multifunctional pin, and an increase in the number of pins of the control circuit is effectively avoided.

What is claimed is:

1. A power conversion apparatus, comprising:
a power conversion circuit, configured to convert an input voltage to an output voltage, wherein the power conversion circuit has an upper bridge switch and a lower bridge switch, the upper bridge switch and the lower bridge switch are connected in series between the input voltage and a ground, the upper bridge switch and the lower bridge switch respectively receive a first pulse width modulation signal and a second pulse width modulation signal to switch their own conduction states, and convert the input voltage to the output voltage; and
a control circuit, coupled to the power conversion circuit and having a boot voltage input pin, wherein the control circuit comprises:
a detecting circuit, coupled to the boot voltage input pin, detecting a current flowing into the boot voltage input pin and converting the current to a corresponding detecting voltage, wherein the detecting circuit comprises:
a current detecting circuit, coupled to the boot voltage input pin, detecting the current flowing into the boot voltage input pin and outputting a detecting current, wherein the current detecting circuit comprises:
a differential amplifier, wherein a positive input terminal is coupled to the boot voltage input pin, and a negative input terminal of the differential amplifier is coupled to a reference voltage;
a first transistor, coupled between the positive input terminal of the differential amplifier and the ground, wherein a gate of the first transistor is coupled to an output terminal of the differential amplifier; and
a second transistor, wherein a gate of the second transistor is coupled to the output terminal of the differential amplifier; and
a conversion circuit, converting the detecting current to the corresponding detecting voltage, wherein the second transistor is coupled between an input terminal of the conversion circuit and the ground; and
an adjusting signal generating circuit, coupled to the detecting circuit, and generating an adjusting signal according to the detecting voltage, wherein the control circuit adjusts a control parameter of the control circuit according to the adjusting signal.

2. The power conversion apparatus as claimed in claim 1, wherein the conversion circuit comprises an analog-to-digital circuit and a digital-to-analog circuit.

3. The power conversion apparatus as claimed in claim 1, wherein the adjusting signal generating circuit comprises:
a comparator, wherein a positive input terminal receives the detecting voltage, a negative input terminal of the comparator is coupled to a common contact point of the upper bridge switch and the lower bridge switch, and an output terminal of the comparator is configured to output the adjusting signal.

4. The power conversion apparatus as claimed in claim 1, wherein the control parameter indicates the conduction states or conduction frequencies of the upper bridge switch and the lower bridge switch.

5. The power conversion apparatus as claimed in claim 1, further comprising:
- a rectifier diode, wherein an anode is coupled to a power voltage; and
- a setting resistor, coupled between a cathode of the rectifier diode and the boot voltage input pin.

6. The power conversion apparatus as claimed in claim 1, further comprising:
- a first driving circuit, coupled to the boot voltage input pin, the common contact point of the upper bridge switch and the lower bridge switch and the upper bridge switch, and outputting the first pulse width modulation signal; and
- a second driving circuit, coupled to output the second pulse width modulation signal.

* * * * *